Oct. 28, 1952 B. LEMANSKI 2,615,296
PICKUP CONVEYER FOR HARVESTING MACHINES
Filed Dec. 26, 1950 2 SHEETS—SHEET 2
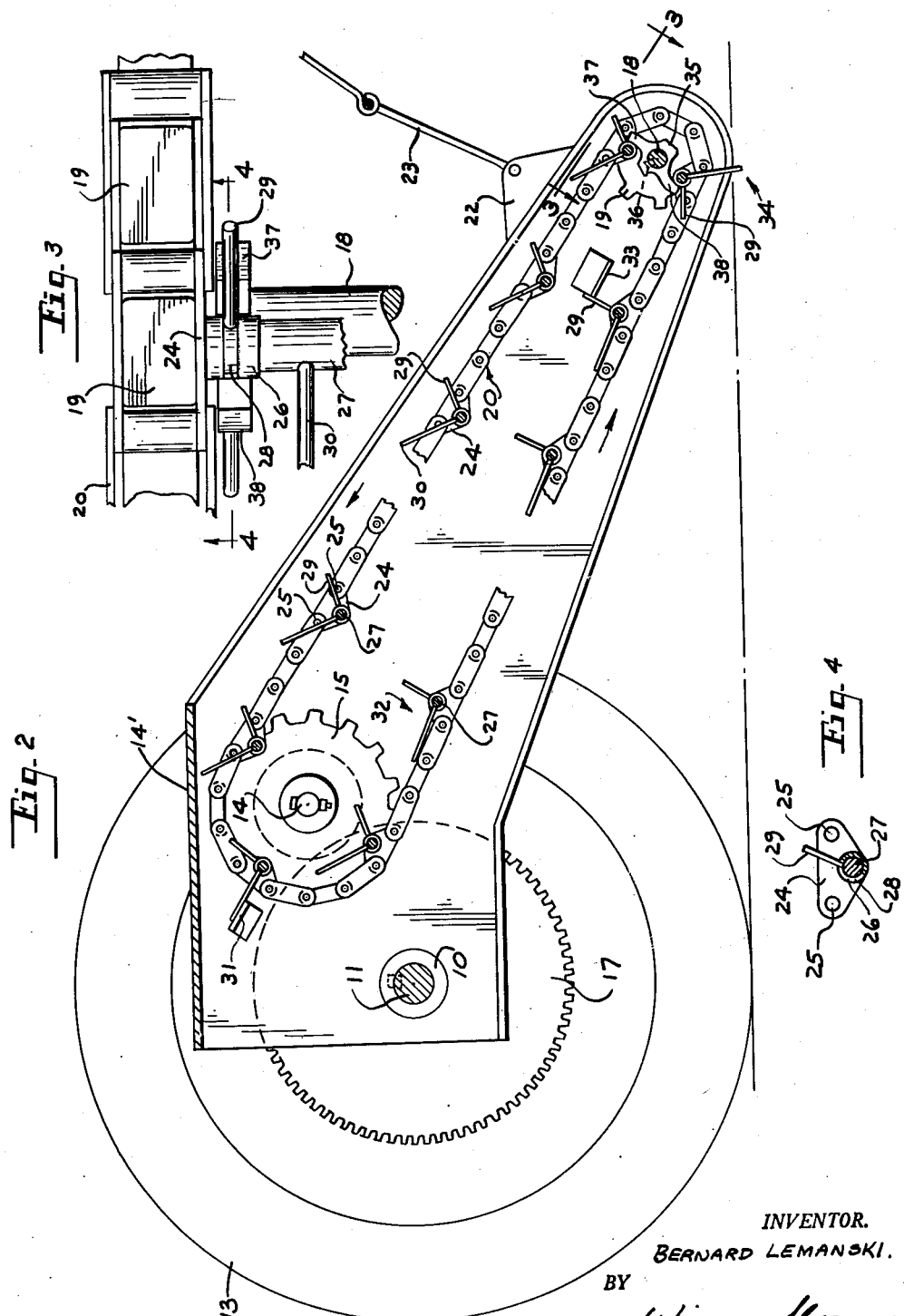
INVENTOR.
BERNARD LEMANSKI.
BY
ATTORNEY.

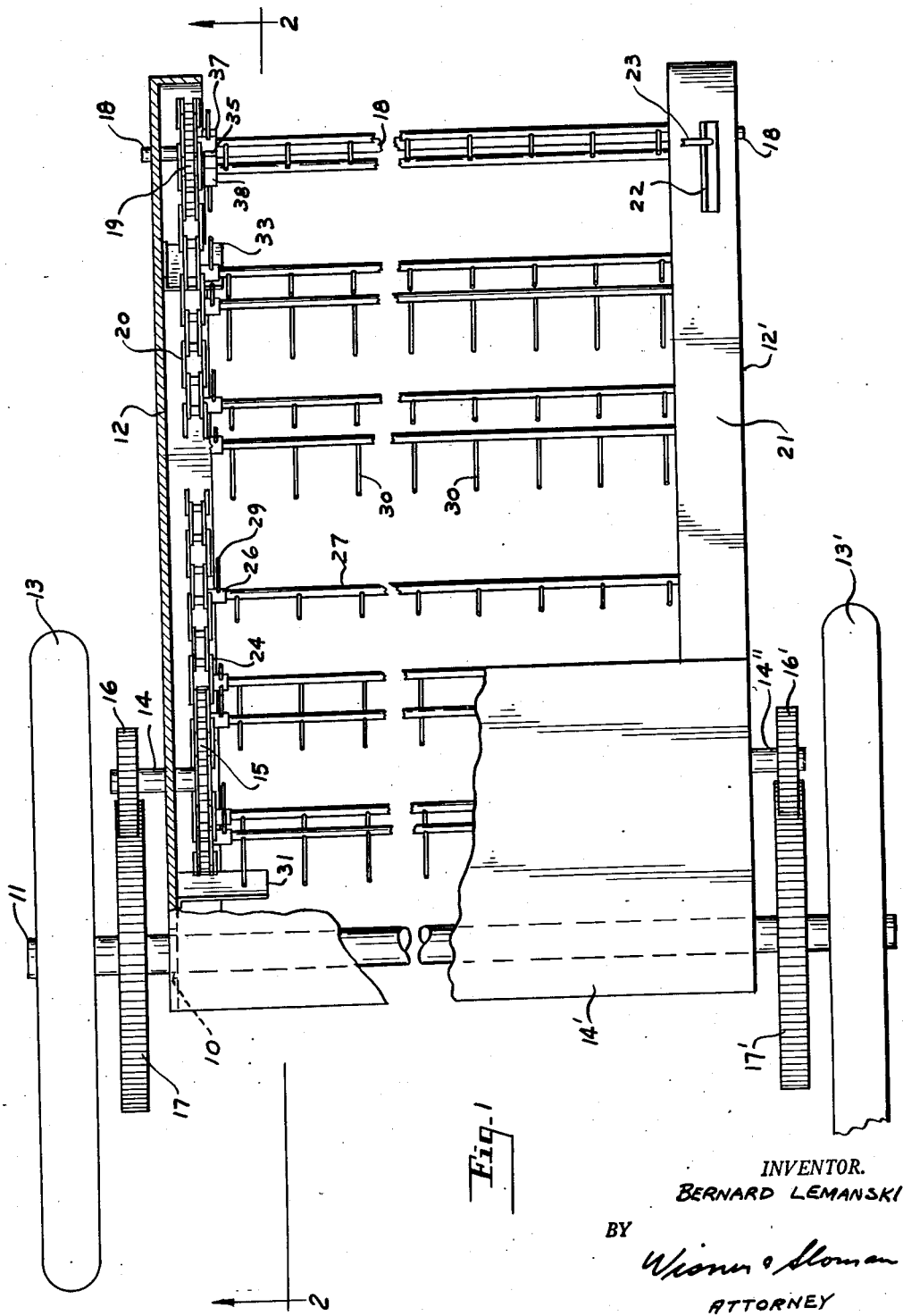

Patented Oct. 28, 1952

2,615,296

UNITED STATES PATENT OFFICE 2,615,296

PICKUP CONVEYER FOR HARVESTING MACHINES

Bernard Lemanski, Bad Axe, Mich.

Application December 26, 1950, Serial No. 202,720

6 Claims. (Cl. 56—364)

This invention relates to a harvesting machine and more particularly to a harvester machine construction including a conveyor mechanism driven by the wheels as said machine is moved forwardly and with said conveyor including a plurality of transverse parallel spaced rods having secured thereon a plurality of upwardly projecting longitudinally spaced fingers.

It is the object of the present invention to provide a simplified harvesting machine together with a simple mechanism for rotatably positioning the respective transverse finger supporting rods by which the article harvested is picked up from the ground and transported to the rear of the machine.

This and other objects will be seen from the following specification and claims in conjunction with the appended drawings in which:

Fig. 1 is a plane view of the harvesting machine with a portion thereof broken away for illustration.

Fig. 2 is a section on line 2—2 of Fig. 1.

Fig. 3 is a section on line 3—3 of Fig. 2 on an enlarged scale; and

Fig. 4 is a section on line 4—4 of Fig. 3 on a reduced scale.

It will be understood that the above drawings illustrate merely a preferred embodiment of the invention and that other embodiments are contemplated within the scope of the claims hereafter set out.

Referring to the drawings the harvesting machine includes a rotatable wheel supporting axle 11 which is transversely journaled through the rear ends of a pair of parallel spaced frame elements 12 and 12' by suitable bushings 10 one of which is shown in Fig. 2. The wheels 13 and 13' are suitably secured upon the axle 11 for rotating the same; and the frame elements 12 and 12' are interconnected at their rear portion by the transverse plate 14'.

A pair of aligned rotatable stud shafts 14 and 14'' are suitably journaled and supported within frame elements 12 and 12' and have secured upon their one ends on the inside of said frame elements sprocket gears 15, one of which is shown in Fig. 1. Gears 16 and 16' are suitably secured upon shafts 14 and 14'' and are in mesh with the enlarged gears 17 and 17' secured to and driven by rotatable axle 11. The sprocket gears 15 one of which is shown, are adapted for driving a pair of parallel spaced forwardly extending sprocket chains 20 one of which is shown in Figs. 1 and 2.

Transverse rotatable shaft 18 extends between and interconnects the forward ends of frame element 12 and 12' through which said shaft is rotatably journaled at its ends. Suitable sprocket gears 19 one of which is shown in Fig. 1, are suitably keyed to said shaft upon the inside of said frame elements and are respectively connected with the sprocket gears 15 by the sprocket chains 20, one of which is shown in Fig. 1, and the other being covered by the top element 21 of the frame 12'.

The frames 12 and 12' are pivotally supported at their rear ends upon the rotatable axle 11 by said bushings 10, Fig. 2, and their front ends have brackets 22 and suitable supporting links 23 connected thereto with the upper ends of said links being adjustably connected with a suitable tongue whereby the front end of the harvesting machine may be raised and lowered in a conventional manner which forms no part of the present invention, and consequently is not illustrated. For a complete description of such mechanism reference is made to U. S. Patent No. 1,119,422 dated December 1, 1914, or U. S. Patent No. 639,691 dated December 19, 1899.

Both of the sprocket chains 20 one of which is shown include chain elements 24 pivotally interconnected at spaced points with adjacent sprocket chain links as at points 25, Fig. 4, throughout the length of said sprocket chains. Cylindrical socket elements 26 are joined at their one ends to the chain elements 24 and are adapted to receive the opposite ends of the parallel spaced transverse rods 27 which are arranged throughout the length of the sprocket chains.

Said rods are supported within socket elements 26 for rocking movement therein, said socket elements having an arcuate slot in a portion thereof designated as element 28. Upright control arms 29 are secured at their inner ends to end portions of the rods 27 and project outwardly through said arcuate slots 28 which are adapted to limit the rocking movements of said rods.

A plurality of longitudinally spaced harvesting fingers or short shafts 30 are secured to the said rods 27 and extend throughout the length thereof as illustrated in Fig. 1. In the present embodiment the control arms 29 are arranged substantially at a right angle to the plane of said harvesting fingers. It will be apparent that the rotative positioning of the shafts 27 within their socket supports can thus be controlled by said control arm 29.

Referring to Figs. 1 and 2, and particularly Fig. 2, it appears that the harvesting fingers are upwardly and rearwardly inclined throughout the upper rearwardly moving portions of the sprocket chains 20.

The stop 31 is secured to and projects inwardly from one or both of the frame elements 12 and 12' and lies in the path of downward movement of the end harvesting fingers 30 so that, as shown in Fig. 2, the rods 27 will be rotated in a clockwise direction as the said end finger engages said stop. As shown in Fig. 2 this rotary movement permits the harvested product to be transmitted rearwardly of the sprocket chain so that the harvesting fingers, as they move forwardly towards the forward end of the machine, are arranged in substantial alignment with the direction of movement of the lower portion of said chains. Towards the forward end of the frames the control arms 29 project against the inwardly directed stop 33 which extends inwardly from one of both of said frame elements, and which is adapted to cause a counter-clockwise rotation of the adjacent rod 27 until the same assumes the position shown in Fig. 2 wherein the fingers are directed downwardly and slightly forward.

Thus it appears that the stops 31 and 33 respectively cause clockwise rotary movement of the rods 27 successively and counter-clockwise rotation within the limits of the length of the arcuate slot 28 in socket elements 26, with control arm 29 riding within the said slot and adapted for engagement with the opposite ends thereof to limit the said rocking movement.

32 designates the relative movement and position of the rod 27 subsequent to its clockwise rotation, whereas 34 designates its relative position at the end of its counter-clockwise rotary movement just as the fingers 30 are positioned for engaging and picking up a particular crop such as beans for example.

It is desirable that the fingers 30 upon the rods 27 as they round the forward end of the frame, have an upward scooping action of slightly increased velocity in order to effectively pick up the vines for transferring the same rearwardly over the upper portion of the conveying mechanism defined by the said rods and sprocket chains.

For this purpose there are provided adjacent the outer ends of rotatable shaft 18 a pair of S-shaped control arms 35 which are suitably keyed as at 36 to said shaft, and which are adapted for rotation therewith. The aforesaid control arm 35 has a pair of oppositely extending end portions 37 and 38 as shown in Fig. 2 wherein the lower portion 38 is adapted for operative engagement with the adjacent control arm 29 on the particular rod directly therebelow as shown in Fig. 2. It is apparent that the control arm element 38 will in effect move the control arm 29 on the rod 27 throughout the length of the arcuate slot 28 of the supporting socket element 26 as said rod is carried substantially below and forwardly of the shaft 18, to thereby effect a scooping upward movement of the corresponding harvesting fingers 30.

As shown in Fig. 2 the control arm element 38 stays in contact with the rod control arm 29 until the same has reached the upper portion of the sprocket chain and begins to move rearwardly of the shaft 18.

Having described my invention reference should now be had to the claims which follow for determining the scope thereof.

I claim:

1. In a harvesting machine having a frame and a wheel carrying axle journaled through the rear end thereof, a transverse shaft rotatably journaled through the forward end of said frame, parallel spaced sprocket chains movably supported at their ends upon said frame and interconnected with said axle and shaft, a plurality of parallel transverse rods interconnecting said chains at spaced points throughout their length and rotatably joined thereto at their opposite ends, a row of upright longitudinally spaced harvesting fingers secured upon each rod throughout its length, a control arm projecting from the one ends of each of said rods and arranged at an angle to said fingers, an inwardly directed lug on the interior of said frame at the rear end of said chains and upon the exterior thereof intermittently and successively engaged by a finger on each of said rods moving the same in a clockwise direction, and a second inwardly directed lug on the interior of said frame adjacent the front end of said chains and upon the interior thereof, intermittently and successively engaged by a control arm on each of said rods moving the same in a counter-clockwise direction.

2. In a harvesting machine having a frame and a wheel carrying axle journaled through the rear end thereof, a transverse shaft rotatably journaled through the forward end of said frame, parallel spaced sprocket chains movably supported at their ends upon said frame and interconnected with said axle and shaft, a plurality of parallel transverse rods interconnecting said chains at spaced points throughout their length and rotatably joined thereto at their opposite ends, a row of upright longitudinally spaced harvesting fingers secured upon each rod throughout its length, a control arm projecting from the one ends of each of said rods and arranged at an angle to said fingers, an inwardly directed lug on the interior of said frame at the rear end of said chains and upon the exterior thereof intermittently and successively engaged by a finger on each of said rods moving the same in a clockwise direction, and a second inwardly directed lug on the interior of said frame adjacent the front end of said chains and upon the interior thereof, intermittently and successively engaged by a control arm on each of said rods moving the same in a counter-clockwise direction, and an S-shaped control arm centrally secured on one end of said shaft with its lower free end operatively engageable with an adjacent control arm therebelow for rotating said rod through an arc of approximately 180 degrees as said rod is projected forwardly, upwardly and rearwardly upon said sprocket chains at their forward ends.

3. In a harvesting machine having a frame and a wheel carrying axle journaled through the rear end thereof, a transverse shaft rotatably journaled through the forward end of said frame, parallel spaced sprocket chains movably supported at their ends upon said frame and interconnected with said axle and shaft, a plurality of parallel transverse rods interconnecting said chains at spaced points throughout their length and rotatably joined thereto at their opposite ends, a row of upright longitudinally spaced harvesting fingers secured upon each rod throughout its length, a control arm projecting from the one ends of each of said rods and arranged at an angle to said fingers, and an S-shaped control arm centrally secured upon one end of said shaft with its lower free end operatively engageable with an adjacent control arm therebelow for rotating said rod through an arc of approximately 180 degrees as said rod is projected forwardly, upwardly and rearwardly upon said sprocket chains at their forward ends.

4. In a harvesting machine having a frame and a wheel carrying axle journaled through the rear end thereof, a transverse shaft rotatably journaled through the forward end of said frame, parallel spaced sprocket chains movably supported at their ends upon said frame and interconnected with said axle and shaft, a plurality of parallel transverse rods interconnecting said chains at spaced points throughout their length and rotatably joined thereto at their opposite ends, a row of upright longitudinally spaced harvesting fingers secured upon each rod throughout its length, control arms joined to and projecting from opposite ends of each of said rods and arranged at an angle to said fingers, an inwardly directed lug on the interior of said frame at the rear end of said chains and upon the exterior thereof intermittently and successively engaged by a finger on each of said rods moving the same in a clockwise direction, and a second inwardly directed lug on the interior of said frame adjacent the front end of said chains and upon the interior thereof, intermittently and successively engaged by a control arm on each of said rods moving the same in a counter-clockwise direction.

5. In a harvesting machine having a frame and a wheel carrying axle journaled through the rear end thereof, a transverse shaft rotatably journaled through the forward end of said frame, parallel spaced sprocket chains movably supported at their ends upon said frame and interconnected with said axle and shaft, a plurality of parallel transverse rods interconnecting said chains at spaced points throughout their length and rotatably joined thereto at their opposite ends, a row of upright longitudinally spaced harvesting fingers secured upon each rod throughout its length, a control arm projecting from the one ends of each of said rods and arranged at an angle to said fingers, an inwardly directed lug projecting inwardly from said frame outside and at the rear of said chains and arranged in the path of travel of said fingers and engageable therewith progressively to effect a clockwise rotary movement of said rods to permit release of the harvested product from said fingers, and a second forwardly arranged lug joined to and projecting inwardly from said frame upon the inside of said chains and arranged in the path of travel of said control arms and engageable therewith to effect counter-clockwise rotary movement of said rods selectively positioning the fingers thereon forwardly for picking up the article to be harvested.

6. In a harvesting machine having a frame and a wheel carrying axle journaled through the rear end thereof, a transverse shaft rotatably journaled through the forward end of said frame, parallel spaced sprocket chains movably supported at their ends upon said frame and interconnected with said axle and shaft, oppositely arranged inwardly directed socket elements secured at spaced points to said chains throughout their length, said elements having an arcuate slot formed through their outer walls, a plurality of parallel transverse rods interconnecting said chains with their ends rotatably positioned within said socket elements, a row of upright longitudinally spaced harvesting fingers secured upon each rod throughout its length, control arms joined to and projecting from the opposite ends of said rods and arranged at an angle to said fingers and guidably projected through said arcuate slots, and a pair of spaced lugs on said frame arranged upon the inside and outside of said chains respectively adjacent their opposite ends lying in the paths of movement of said control arms and fingers respectively for alternately rotating said rods in opposite directions within said socket elements with said control arms riding to the opposite ends of said arcuate slots alternately.

BERNARD LEMANSKI.

REFERENCES CITED

The following references are of record in the file of this patent:

UNITED STATES PATENTS

| Number | Name | Date |
|---|---|---|
| 833,309 | Davison | Oct. 16, 1906 |
| 2,284,777 | Sund | June 2, 1942 |